UNITED STATES PATENT OFFICE.

JOHN E. HUTCHINSON, OF ASPINWALL, PENNSYLVANIA, ASSIGNOR TO JAMES F. HENDERSON, OF PITTSBURGH, PENNSYLVANIA.

MATERIAL FOR PURIFYING GAS AND PROCESS FOR MANUFACTURING THE SAME.

1,370,495. Specification of Letters Patent. Patented Mar. 1, 1921.

No Drawing. Application filed February 15, 1919, Serial No. 277,306. Renewed August 27, 1920. Serial No. 406,523.

*To all whom it may concern:*

Be it known that I, JOHN E. HUTCHINSON, a citizen of the United States, and residing in the borough of Aspinwall, in the county of Allegheny and State of Pennsylvania, have invented or discovered new and useful Improvements in Materials for Purifying Gas and Processes for Manufacturing the Same, of which the following is a specification.

My invention consists in a new and improved material for purifying gas and for similar purposes, and in the process for manufacturing the same.

Artificial gas contains impurities. such as sulfur in the form of sulfureted hydrogen, which must be removed before the gas is fitted for use. This purification is accomplished by passing the gas through boxes loaded with a material which takes up the impurities.

In the most common practice of today, this purifying material is formed by mixing hydrated oxid of iron, or some other substance which has an affinity for sulfur, with a vegetable fluffing material, such as wood shavings, planer chips, saw dust, corn cobs, &c., using moisture as a bond.

This composite material is open to numerous objections. Thus it is inflammable and subject to spontaneous combustion; the heat of the gas absorbs the moisture, breaking the bond and permitting the oxid of iron to drop down into the bottom of the boxes and pack, thus interfering with the free passage of the gas; also the valuable elements deposited by the gas can not be readily recovered, owing to the contamination caused by the vegetable substances. Where the moisture is not evaporated, the material tends to become soggy or colloidal, thus resisting the passage of the gas.

It has been proposed to use porous blast furnace slag as the fluffing material, but as moisture is still relied upon as the bond, the oxid of iron exhibits the same tendency to loosen and pack in the bottom of the boxes. Moreover, blast furnace slag is obtainable only in certain limited localities throughout the world where blast furnaces are situated, and therefore the limited supply of slag and the excessive cost of transportation for long distances prevent the substitution of slag for vegetable material becoming general.

The object which I have in view is the provision of a composite purifying material which may be cheaply produced in any part of the world; which will efficiently perform the functions required, and from which the valuable substances which are deposited by the gas may be readily recovered in usable form.

The following is a description of my improved purifying material and of the process of manufacturing the same.

I form a mix of a substance having an affinity for sulfur, such as hydrated oxid of iron; silica sand, sand rock granules or particles; a calcareous cement, and water, and thus form a porous concrete mass. I have successfully used four parts of oxid of iron; three parts of sand; one part of cement and sufficient water to form an easily worked mortar. These elements are thoroughly mixed together and allowed to set. The sand imparts porosity to the concrete, which characteristic may be increased by the presence in the sand of small gravel or particles of sand rock.

After setting, the concrete mass is broken into fragments none of which should, preferably, be more than an inch in their greatest dimension.

These fragments are then loaded into the boxes in the usual manner and the gas passed through the same.

The porosity of the purifying material together with the interstices between the fragments of concrete permit of the rapid passage of the gas and effect the complete elimination of its impurities.

The incorporation of the oxid of iron, or its equivalent, in the concrete insures the permanency of the bond, so that there is no danger of packing or clogging of the material in the bottom of the boxes. The ability of the material to "stand up" and to maintain its open, porous character make packing or clogging impossible, so that the material retains its full efficiency until, after repeated uses, it becomes saturated with the deposited impurities. After such saturation, the valuable elements deposited by the gas may be readily recovered from the composite material without loss and in a pure state.

If desired, the broken concrete fragments may be wetted and mixed with an additional quantity of the oxid of iron before loading into the boxes, thus greatly enriching the purifying qualities of the material. Or, I may omit the oxid of iron from the mix which forms the concrete, and then dampen the concrete fragments and mix the same with the oxid of iron before loading the material into the boxes. I prefer, however, to use the material having an affinity for sulfur as one of the elements of the concrete mix, thus obtaining a better incorporation of the same throughout the mass of material and insuring a permanent bond.

Cement is now largely manufactured throughout the world, and its distribution commercially practically universal, so that the purifying material may be cheaply manufactured anywhere, thereby avoiding the excessive transportation costs which are unavoidable in the case of material obtainable only in certain confined localities.

My improved purifying material is absolutely fireproof, and can not become soggy or colloidal.

What I desire to claim is—

1. A purifying material for gas comprising a porous concrete formed of cement, silica and hydrated oxid of iron.

2. A purifying material for gas comprising a porous concrete mass formed of cement, silica and hydrated oxid of iron broken into fragments.

3. The process of manufacturing a material for purifying gas which consists in mixing cement, silica and hydrated oxid of iron in water to form a porous concrete mass, reducing the set mass to fragments, and mixing the fragments with an additional quantity of the substance having an affinity for sulfur and sufficient water to form a bond.

Signed at Pittsburgh, Pa., this 8th day of February, 1919.

JOHN E. HUTCHINSON.